(No Model.)

W. SELLERS.
GRASS HOOK.

No. 529,685. Patented Nov. 20, 1894.

Witnesses.
Winifred G. Kirwin.
Edward D. Brown.

Inventor.
William Sellers
by Edwin Planta.
Attorney.

UNITED STATES PATENT OFFICE.

WILLIAM SELLERS, OF HAVERHILL, MASSACHUSETTS.

GRASS-HOOK.

SPECIFICATION forming part of Letters Patent No. 529,685, dated November 20, 1894.

Application filed November 13, 1893. Serial No. 490,780. (No model.)

*To all whom it may concern:*

Be it known that I, WILLIAM SELLERS, a citizen of the United States, residing at Haverhill, in the county of Essex and State of Massachusetts, have invented certain new and useful Improvements in Grass-Hooks, of which the following, taken in connection with the accompanying drawings, is a specification.

The object of my invention is to produce a grass hook the handle of which will be above the level of the blade so that when in use the blade will be on a level with the ground and the handle will be a sufficient distance above the same to allow for the hand of the operator.

The invention consists of a blade connected to the handle, so that the handle is raised above the level of the blade and also cause the hook to be self balancing, that is to say the weight of the hook on one side of a line taken longitudinally through the center of the handle will be the same as that on the other side.

Figure 1:
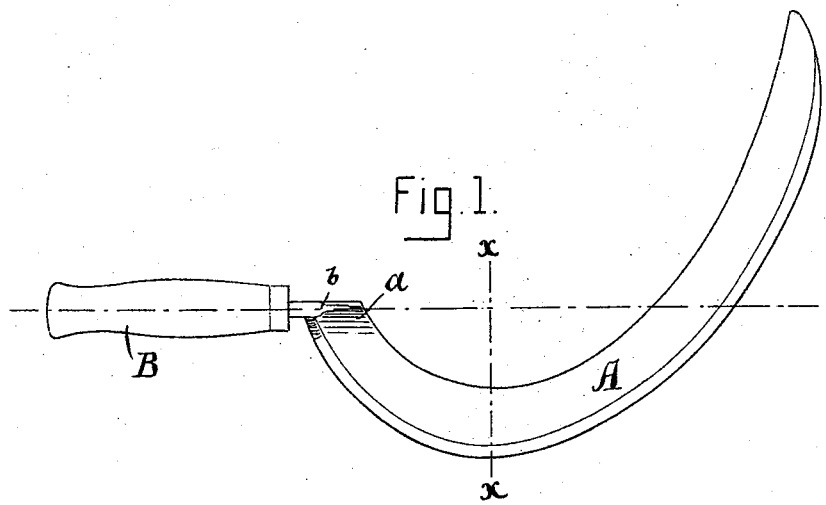
Figure 2:
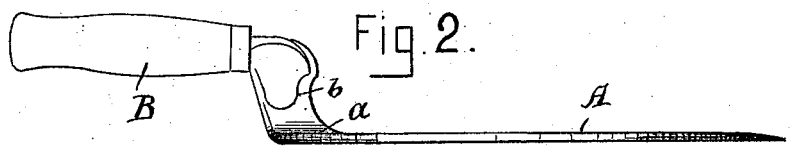
Figure 3:
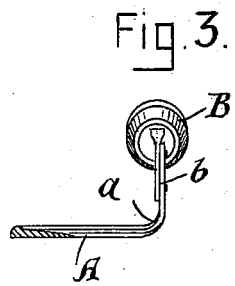

Referring to the accompanying drawings:—Figure 1— represents a plan or top view of a grass hook embodying my invention. Fig. 2— is a side view of the same, and Fig. 3— is a vertical section taken on line x,x, of Fig. 1.

A, represents the blade of the hook which I have shown as being bent at about the point a, so that its rear end b, is at about right angles to the main portion of the blade A'. To the upper portion of this rear end b, is secured the handle B, which is thus caused to stand some distance above the blade A, thus allowing room for the hand of the operator while the blade itself is on a level with the ground. Although I have shown the blade bent, it may be attached to the handle in any suitable manner so that the blade is dropped below the handle. It will be seen that by this construction the operator is enabled to bring the full length of the blade to an equal distance from the ground, from its heel to its toe. Thus the grass will be cut to an even height throughout which is not possible with grass hooks as usually constructed as with such hooks the blade is always held on an incline thus cutting the grass short at the point of the blade and graduating in length to the heel of the same; and furthermore with grass hooks as usually made, the weight of the hook (on a line taken through the center of the handle) is more on one side than on the other, thus causing the operator to exert muscular strength to overcome the weight on the heavy side, whereas in a hook made according to my invention this is obviated as the hook is evenly balanced, that is to say the weight of the hook on one side of a line taken longitudinally through the center of the handle is the same as that on the other side. Thus both sides being equal the blade will not tilt to one side or the other. Thus it can be operated with less power.

What I claim is—

In a grass hook a handle raised above the level of the blade whereby when the blade is on the ground the hand of the operator will be free from same the said blade being balanced in the manner and for the purpose set forth.

In testimony whereof I have signed my name to this specification, in the presence of two subscribing witnesses, on this 30th day of September, A. D. 1893.

WILLIAM SELLERS.

Witnesses:
CLARENCE B. MITCHELL,
JARED M. DAVIS.